US012601111B2

(12) United States Patent
May

(10) Patent No.: US 12,601,111 B2
(45) Date of Patent: Apr. 14, 2026

(54) MEDICINAL FABRIC FOR DERMATOLOGICAL USE CASES AND ASSOCIATED METHOD FOR MANUFACTURING THE SAME

(71) Applicant: JM MARK INC., Middletown, DE (US)

(72) Inventor: Michel May, Munich (DE)

( * ) Notice: Subject to any disclaimer, the term of this patent is extended or adjusted under 35 U.S.C. 154(b) by 944 days.

(21) Appl. No.: 17/786,145

(22) PCT Filed: Jun. 8, 2021

(86) PCT No.: PCT/US2021/036283
§ 371 (c)(1),
(2) Date: Jun. 16, 2022

(87) PCT Pub. No.: WO2022/260649
PCT Pub. Date: Dec. 15, 2022

(65) Prior Publication Data
US 2024/0158985 A1 May 16, 2024

(51) Int. Cl.
| | |
|---|---|
| *D06P 1/34* | (2006.01) |
| *C09B 61/00* | (2006.01) |
| *D03D 1/00* | (2006.01) |
| *D03D 13/00* | (2006.01) |
| *D03D 15/217* | (2021.01) |
| *D03D 15/54* | (2021.01) |
| *D06P 3/60* | (2006.01) |

(52) U.S. Cl.
CPC ............... *D06P 1/34* (2013.01); *C09B 61/00* (2013.01); *D03D 1/00* (2013.01); *D03D 13/00* (2013.01); *D03D 15/217* (2021.01); *D03D 15/54* (2021.01); *D06P 3/60* (2013.01); *D10B 2201/02* (2013.01); *D10B 2401/13* (2013.01); *D10B 2509/00* (2013.01)

(58) Field of Classification Search
CPC ........... D06P 1/34; D06P 3/60; D03D 15/217; D03D 15/54; D03D 1/00; D03D 13/00; C09B 61/00; D10B 2201/02; D10B 2401/13; D10B 2509/00
USPC .......................................................... 8/494
See application file for complete search history.

(56) References Cited

U.S. PATENT DOCUMENTS

| | | | |
|---|---|---|---|
| 6,815,379 B2 | 11/2004 | Nomura | |
| 7,074,482 B1 | 7/2006 | Nishimura et al. | |
| 7,117,899 B1 | 10/2006 | Kim | |
| 11,041,260 B2 | 6/2021 | Ando et al. | |
| 2018/0151795 A1 | 5/2018 | Cobanoglu et al. | |

FOREIGN PATENT DOCUMENTS

| | | | | |
|---|---|---|---|---|
| CN | 1566512 | A | 1/2005 | |
| CN | 102517912 | A | 6/2012 | |
| CN | 101144217 | B | 11/2012 | |
| CN | 103255522 | B | 5/2015 | |
| CN | 104652013 | A | 5/2015 | |
| CN | 104894713 | A | 9/2015 | |
| CN | 104278421 | B | 6/2016 | |
| CN | 107604645 | A | 1/2018 | |
| CN | 108774789 | A | 11/2018 | |
| CN | 109355935 | A | * 2/2019 | ............... D06P 1/34 |

OTHER PUBLICATIONS

Fiber2fashion, Interview with Michael May. Jan. 1, 2019. https://www.fibre2fashion.com/interviews/face2face/aizome-bedding/co-founder/12089-1.*
https://web.archive.org/web/20210226034321/https://www.ecobutterfly.com/pakuchoorganiccottonfabric/peruviangotsorganicpimacottonin terlockfabricindigoheather/ Feb. 26, 2021 https://www.ecobutterfly.com/pakuchoorganiccottonfabric/peruviangotsorganicpimacottonin terlockfabricindigoheather/.*
Aizome, Antibacterial Properties: Test Results. Mar. 18, 2019. https://aizome-textiles.com/pages/anti-bacterial-properties-test-result?srsltid=AfmBOopJAerB-l2zRAc11lTTuOY5GiykL8J4wxw-z8es_kXIBb1l9Zk7.*
Aizomes's Bedding: Healthy Indigo Bedding. Apr. 28, 2020. https://aizome-textiles.com/blogs/press/aizomes-bedding-healthy-indigo-bedding.*

(Continued)

*Primary Examiner* — Amina S Khan
(74) *Attorney, Agent, or Firm* — King & Partners, PLC

(57) ABSTRACT

A method for manufacturing medicinal fabric that provides enhanced dermatological comfort for the user/patient, especially those with sensitive skin conditions (e.g., acne, contact dermatitis, atopic dermatitis, eczema, psoriasis, rosacea, urticaria, etcetera) including the steps of: (1) selecting a cotton fiber, wherein the cotton fiber is long staple cotton and 100 percent organic; (2) processing the cotton fiber as greige cotton; (3) optionally verifying that the cotton fiber is organic per Global Organic Textile Standards or comparable standards; (4) fermenting or otherwise naturally preparing an herb or plant into a medicinally potent agent/substance and hypoallergenic dyeing agent; (5) using a skin-friendly binding technique, such as binderless dyeing the cotton fiber with the agent/substance via ultrasonic energy or using a technique that similarly uses no irritative chemical binders; (6) selecting a suitable weave type for the specific use/case to reduce mechanical irritation to the user/patient; (7) optionally verifying that the woven cotton fiber has not been contaminated during the manufacturing process through toxicological verification methods; and (8) optionally verifying that the woven cotton fiber passes the standardized dermatological Human Repeat Insult Patch Test.

1 Claim, No Drawings

(56)　　　　　　References Cited

OTHER PUBLICATIONS

Impetus Bioscience, Identification of Pima Cotton, Jan. 17, 2020. https://www.impetus-bioscience.de/identifizierung-von-pima-baumwolle/?lang=en https://web.archive.org/web/20200117111058/https://www.impetus-bioscience.de/identifizierung-von-pima-baumwolle/?lang=en.*
Aya Dyeing & Weaving Studio. The Blessing of Aya: Indigo by naturallu fermented. Sep. 30, 2019. https://web.archive.org/web/20190930204321/https://www.ayasilk.com/en/workshop/indigo.html https://www.ayasilk.com/en/workshop/indigo.html.*

* cited by examiner

MEDICINAL FABRIC FOR DERMATOLOGICAL USE CASES AND ASSOCIATED METHOD FOR MANUFACTURING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to fabrics, and, more particularly, to medicinal fabrics that provide enhanced dermatological comfort for the user/patient, especially those with sensitive skin conditions (e.g., acne, contact dermatitis, atopic dermatitis, eczema, psoriasis, rosacea, urticaria, etcetera). The present invention further relates to methods for manufacturing medicinal fabrics, especially antibacterial fabrics having enhanced dermatological comfort.

2. Background Art

The selection and/or utilization of fabric for those with sensitive skin can be problematic because, among other reasons, the fabric and the person's skin are constantly in contact with each other. While cotton fabric is typically recommended for those with sensitive skin, it remains replete with drawbacks and/or complications, namely: (1) mechanical irritation (e.g., the expansion/contraction of short fibers is insufficient); (2) pathogenic irritation (e.g., cotton is known to harbor and/or facilitate the growth of bacteria, such as, for example, *Bacillus, Micrococcus, Staphylococcus, Pseudomonas*, etcetera); and (3) chemical irritation (e.g., toxic synthetic dyes and residual chemicals from pesticides to finishing agents are commonly utilized in fabric processing). The present invention utilizes a manufacturing process that does two things: (1) It does away with most sources of irritation that cotton fabrics bring to sensitive skin, and thus produces highly potent fabrics that bring comfort and higher quality of life to children and adults with sensitive skin conditions; and (2) It allows to bind herbal dyes with scientifically proven effects into the textile without the use of binding agents. Herbal dyes such as indigo are used in skin creams and medical ointment for their dermatology. This invention allows the wearer of the fabric to benefit long-term from the herbal property.

By way of additional background, fabrics and associated methods for manufacturing the same have been known in the art for years, and are the subject of a plurality of patents including, for example: U.S. Pat. No. 6,815,379 entitled "Antibacterial Cloth," Chinese Patent Application Publication Number CN 108774789 entitled "A Kind of Antibacterial Anti-Anaphylaxis Functional Fabric," Chinese Patent Application Publication Number CN 107604645 entitled "A Kind of Comfortable Composite Material of Antibacterial," Chinese Patent Application Publication Number CN 104894713 entitled "Production Technology of Anti-Microbial Yarns," Chinese Patent Application Publication Number CN 104278421 entitled "Antibacterial Safe Wet Absorption Quick Drying Fabric and Preparation Method Thereof," Chinese Patent Application Publication Number CN 104652013 entitled "Novel Anti-Bacterial Fabric Preparation Process," Chinese Patent Application Publication Number CN 103255522 entitled "Antibacterial Fabric, Preparation Technology Thereof and Textile Thereof," Chinese Patent Application Publication Number CN 102517912 entitled "Preparation Method of Nano-Grade Silver Antibiotic Fabric," Chinese Patent Application Publication Number CN 101144217 entitled "Fabric Product with Antibiosis, Deodorization, Heat Emission and Cooling Function," and Chinese Patent Application Publication Number CN 1566512 entitled "Antibacterial Fabric and Its Preparation Method and Application"—all of which are hereby incorporated herein by reference in their entirety including all references cited therein.

U.S. Pat. No. 6,815,379 appears to disclose an antibacterial cloth having an antibacterial imparting glass composition complexed therewith. The glass composition comprises 0.1-5.0 percent by weight of $Ag_2O$ in a composition containing 45-67 mol percent of $P_2O_5$, 5-20 mol percent of $Al_2O_3$, 1-22 mol percent of one or more selected from MgO, CaO and ZnO, and 1-20 mol percent of $B_2O_3$.

Chinese Patent Application Publication Number CN 108774789 appears to disclose an antibacterial anti-anaphylaxis functional fabric, the weight percent of each raw material is: spandex fiber 25-40 percent, staple fiber silk 10-20 percent, PBT/PET composite fiber 20-25 percent, nano-antibacterial anti-anaphylaxis lotion 10-16 percent, crosslinking agent 1-3.5 percent, bonding agent 6-10 percent, dispersant 1-3 percent, softening agent 0.5-2 percent. The antibacterial anti-anaphylaxis functional fabric is prepared in the following manner: the crosslinking agent is added after the spandex fiber, the staple fiber silk, the PBT/PET composite fiber, and the nano-antibacterial anti-anaphylaxis lotion are mixed, reacted and allowed to cool down. Next the bonding agent, dispersant, softening agent, and water are added, mixed evenly, and then dried whereupon the fabric is ready for conventional finalization.

Chinese Patent Application Publication Number CN 107604645 appears to disclose an antibacterial composite material. The antibacterial composite material includes the following components by weight: 40-60 parts of sheng-bast fiber, 10-20 parts of combed cotton, 5-15 parts of nanometer bamboo carbon fiber, 3-8 parts of acetate fiber, 1-5 parts of polyamide fiber cotton, 3-8 parts of negative ion PP chopped fiber, 1-3 parts of modal fiber, 2-6 parts of short silk fiber, 0.2-0.8 parts of titanium oxide, and 0.5-3 parts of an antibacterial finishing agent. The antibacterial finishing agent includes the following components by weight: 30-45 parts of rosin based aqueous polyurethanes, 10-20 parts of glycine betaine, 3-8 parts of zine oxide, 1-6 parts of polyhydroxypropyldimonium chloride, and 0.5-3 part of neopelex.

Chinese Patent Application Publication Number CN 104894713 appears to disclose a production technology for anti-microbial yarns, which comprises selecting raw materials, blowing, cotton carding, combing, drawing, roving, spinning and spooling. The production technology for the anti-microbial yarns provides advantages through the selection of raw materials and process arrangements. The fabric made by the yarns has enhanced adsorption capacity and anti-microbial activity.

Chinese Patent Application Publication Number CN 104278421 appears to disclose an antibacterial fabric and method for preparing the same. The fabric is formed by braiding the first yarn, the second yarn and the third. The first yarn is a textile fiber or a blend of cotton fiber, flaxen fiber, polyester fiber, and polyacrylonitrile fiber. The second yarn is a modified polyester fiber associated with ionic silver. The third yarn is polyurethane fiber.

Chinese Patent Application Publication Number CN 104652013 appears to disclose a novel anti-bacterial fabric preparation process, belonging to the field of textiles and can effectively solve the problem that a common anti-bacterial fabric is difficult to wash and exhibits poor anti-bacterial activity. In particular, 15 kilograms of bamboo charcoal fibers, 5 kilograms of picked cotton fibers, 39 kilograms of polyester fibers, and 1 kilogram of silk are woven into synthetic fiber yarns by a spinning machine. The produced synthetic fiber yarns are prepared and woven into cloth so that an anti-bacterial fabric can be made.

Chinese Patent Application Publication Number CN 103255522 appears to disclose an antibacterial fabric. The antibacterial fabric comprises, by weight, 10-20 parts of short fiber silk, 20-25 parts of anion polypropylene staple fibers, 15-25 parts of nano bamboo carbon fiber, 2-5 parts of nano-titanium dioxide, 5-10 parts of nano-silver fiber, 2-4 parts of anti-mite finishing agent, 3-8 parts of sweat-absorbent quick-drying processing agent, 12-18 parts of binder, 2-4 parts of dispersing agent, 3-5 parts of fabric softener, and 80-85 parts of polyester cotton fiber.

Chinese Patent Application Publication Number CN 102517912 appears to disclose a preparation method of nano-grade silver antibiotic fabric. The method comprises the steps that: (1) under a temperature of 35-45 degrees centigrade, nano-grade silver micro-particles are added to polyurethane and water; the mixture is stirred; a microcapsule solution is added to the mixture; the mixture is stirred, and an emulsion is obtained; stirring is continued; a dispersant, an adhesive and a softening agent are sequentially added, such that a nano-grade silver microcapsule finishing agent is obtained; (2) yarn is processed by using the nano-grade silver microcapsule finishing agent; pre-baking and shaping baking are carried out, and yarn with the nano-grade silver microcapsule is obtained; (3) the yarn with the nano-grade silver microcapsule is adopted as middle-layer weft yarn, and three-layered fabric is obtained by weaving. A pre-shaping locking treatment is carried out, such that the nano-grade silver antibiotic fabric is obtained. The preparation method provided by the invention is simple; the nano-grade silver microcapsule finishing agent is applied on the yarn, and comfortableness of the fabric is not influenced. According to the invention, the yarn with the nano-grade silver microcapsule is positioned in the middle layer of the three-layered fabric, and does not contact human body or external environment directly. Therefore, the fabric is safe and environment-friendly.

Chinese Patent Application Publication Number CN 101144217 appears to disclose a fiber product having the performances of antibiosis, odor elimination, heat dissipation and cooling. The present invention comprises woven fabric, knitted fabric, non-woven fabric film or a combination body of the fabric and the film, and is made by weaving continuous filament fiber or short fiber having various different cross section shapes, sizes, colors, structures, etc. The fiber adopts sub-micron or nanometer powder with high heat diffusion coefficient and low heat conduction coefficient, and is added into thermoplastic plastic grains in a quantitative way after being decentralized with an interfacial agent. The thermoplastic plastic grains are fully mixed with the sub-micron or nanometer powder with the high heat diffusion coefficient and the low heat conduction coefficient by a mixing machine or a kneading machine or by utilizing the chemical synthesis method, and then are made into masterbatch with a granulating machine. Finally, the fiber product having the functions of antibiosis, odor elimination, heat dissipation and cooling can be made by using the melting, and the dry and the wet spinning technologies and through the pre-designed spinneret.

Chinese Patent Application Publication Number CN 1566512 appears to disclose an antibiotic fabric and method for making same and uses thereof. Nanometer titanium dioxide attaches on or between the fiber of the antibiotic fabric, The antibiotic fabric is made by sufficient contacts with the dressing liquid of the nanometer titanium dioxide and drying after that. The invention can decompose and degrade multiple harmful bacteria under natural light.

While the above-identified patents and publications do appear to disclose various medicinal/antibacterial fabrics and associated methods for manufacturing the same, their methods remain non-desirous and/or problematic inasmuch as, among other things, none of the above-identified patents and publications appear to provide a medicinal/antibacterial fabric with genuinely enhanced dermatological comfort for those with sensitive skin conditions.

These and other objects of the present invention will become apparent in light of the present specification, claims, and drawings.

SUMMARY OF THE INVENTION

The present invention is directed to a method for manufacturing medicinal fabric that provides enhanced dermatological comfort for those with sensitive skin conditions, comprising, consisting essentially of and/or consisting of the steps of: (1) selecting (and/or obtaining, providing, etcetera) a cotton fiber, wherein the cotton fiber is long staple cotton and 100 percent organic; (2) processing the cotton fiber as greige cotton; (3) verifying that the cotton fiber is organic per Global Organic Textile Standards or comparable standards; (4) fermenting or otherwise naturally preparing an herb or plant (e.g., indigo) into a medicinally potent agent/ substance; (5) using a skin-friendly binding technique, such as binderless dyeing the cotton fiber with the agent/substance via ultrasonic energy or using a technique that similarly uses no irritative chemical binders; (6) selecting a suitable weave type (e.g., sateen weave) for the specific use/case to reduce mechanical irritation to the user/patient; (7) optionally verifying that the woven cotton fiber has not been contaminated during the manufacturing process through toxicological verification methods; and (8) optionally verifying that the woven cotton fiber passes the standardized dermatological Human Repeat Insult Patch Test.

In a preferred embodiment of the present invention, the cotton fiber includes long staple, *Gossypium barbadense* cotton fiber.

In another preferred embodiment of the present invention, the cotton fiber is free or substantially free (i.e., less than 2 percent) from any residual pesticides.

In yet another preferred embodiment of the present invention, the step of processing the cotton fiber occurs in the absence of bleach and/or any other irritants.

In a preferred embodiment of the present invention, the fermenting agent comprises herbs and/or plants that have proven medicinal effects.

In another preferred embodiment of the present invention, the fermenting agent comprises at least one product selected from the group consisting of indigo leaf, pomegranate, gardenia, madder, onion, mango, jackwood, sandalwood, and combinations thereof.

In yet another preferred embodiment of the present invention, the step of dyeing the cotton fiber via ultrasonic energy includes the step of dyeing via dual-frequency, dual-intensity ultrasonic energy. Alternative other skin-friendly binding techniques can be utilized that avoid the use of chemicals that can have a negative impact on skin.

In a preferred embodiment of the present invention, the woven cotton fiber comprises an antibacterial index of greater than 2 (i.e., 2+, 3, 4, 5, 6).

The present invention is directed to a method for manufacturing medicinal fabric that provides enhanced dermatological comfort for those with sensitive skin conditions, comprising, consisting essentially of and/or consisting of the steps of: (1) selecting a cotton fiber, wherein the cotton fiber is long staple, *Gossypium barbadense* and 100 percent organic; (2) processing the cotton fiber as greige cotton in the absence of bleach; (3) verifying that the cotton fiber is organic per Global Organic Textile Standards or comparable standards; (4) fermenting or otherwise naturally preparing an herbal dye agent/substance (e.g., indigo) into a medicinally potent dye; (5) using a skin-friendly binding technique, such as binderless dyeing the cotton fiber with the agent/substance via ultrasonic energy or using a technique that similarly uses no irritative chemical binders; (6) selecting a suitable weave type (e.g., sateen weave) for the specific use/case to reduce mechanical irritation to the user/patient; (7) optionally verifying that the woven cotton fiber has not been contaminated during the manufacturing process through toxicological verification methods; and (8) optionally verifying that the woven cotton fiber passes the standardized dermatological Human Repeat Insult Patch Test.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

The present invention is directed to a method for manufacturing medicinal fabric that provides enhanced dermatological comfort for those with sensitive skin conditions, comprising the following general steps: (1) selecting cotton that is preferably long staple cotton, such as *Gossypium barbadense*; (2) selecting cotton that is preferably 100% organic; (3) processing as greige virgin cotton (unbleached); (4) certifying the source as GOTS (Global Organic Textile Standard) grade "organic" or comparable; (5) fermenting or otherwise naturally preparing herbal dye agents/substances, such as indigo leaf (or other plant) dye; (6) dyeing using sonic sound waves or utilizing other skin-friendly binding techniques; (7) using suitable weave type for the respective body parts the fabric will be in touch with to reduce mechanical irritation; (8) no chemical finishing; (9) passing toxicological fabric test and verify properties; and (10) passing dermatological HRIPT Test.

The above-identified manufacturing and/or production process avoids any sources for dermatological irritation typical seen with fabrics. Step-1-3 ensure the correct sourcing of fibers: Long staples in the cotton, such as *Gossypium barbadense* (Step 1) reduce mechanical irritation as cotton fibers can stretch more before frailing. A long staple fiber is preferably between 1⅛" and 1¼" long. 100% of organic cotton (Step 2) guarantees no residual pesticides remain that could irritate sensitive skin. Using greige cotton (Step 3) eliminates the chance of irritations from residual bleach. Raw, virgin lint, which is ginned cotton that has not been washed and bleached, is referred to by the industry as "greige" cotton. The correct sourcing of the cotton (Steps 1-3) is verified by the strict GOTS 'Transaction Certification' with the requirements to be labeled as greige cotton and graded as "100% organic". If the GOTS label is not available, other third-party verification for the cotton quality may be used. This step verifies that no accidental mix-up of organic on non-organic cotton has occurred. If the test fails, the production should be terminated. It is common that supply chains are so opaque that even organic labeled products are not or just partially organic.

GOTS is recognized as the world's leading processing standard for textiles made from organic fibers. It defines high-level environmental criteria along the entire organic textiles supply chain and requires compliance with social criteria as well. Only textile products that contain a minimum of 70% organic fibers can become GOTS certified. All chemical inputs, such as dyestuffs and auxiliaries used must meet certain environmental and toxicological criteria. The choice of accessories is limited in accordance with ecological aspects as well. A functional wastewater treatment plant is mandatory for any wet-processing unit involved and all processors must comply with minimum social criteria.

Step 4 is a test to verify that sourced cotton passes these specific requirements. Steps 5-8 disclose preferred dyeing and finishing process. For example, Indigo Naturalis (which may be used in Step 5) is a plant that can be fermented into a medicinal/antibacterial and hypoallergenic dyeing agent/substance. Sonic wave dyeing (Step 6) does two things: (1) eliminates the chance of chemical irritation due to synthetic dyes or mordants; (This is a physical dyeing process in which the color is fixed into the textile using physical force rather than a chemical reaction.); and (2) keeps the skin-beneficial properties (such as the anti-bacterial properties of indigo and other medicinal agents such as Tryptanthrin) of the plant dye. This replicates the traditional hand-made process in which the properties are transferred into the fabric. For this, a dual-frequency mechanism is preferably used: In the dyeing process, the ultrasonic wave range is 20 KHz-28 KHz. Dyeing temperature is as low as 15° C. and not higher than 35° C. and dyeing time is 10-60 minutes. In the dyeing process, the multi-frequency ultrasonic intensity is 0.1-0.8 W/cm. During the soaping process, the frequency selection range of ultrasonic waves is 28 KHz-55 KHz, and the soaping temperature is between 20° C.-35° C. Soaping time is 5-30 minutes, while multi-frequency ultrasonic intensity is 0.2-1 W/cm². This process also uses almost no water, and produces no toxic wastewater like most other fabric dyeing processes. Sateen weaving (Step 7) creates the smoothest surface possible for cotton for textiles such as bedsheets, which significantly reduces mechanical irritation to skin. Shirts which need to allow for stretching and higher breathability because they enclose the torso should be made from jersey knitted fabric. Any finishing agents (Step 8) should be avoided or need to fulfill the criteria of being plant-based and have hypoallergenic properties. Step 9 and 10 are a set of tests that help qualify the fabric according to the framework of this invention. Step 9 is an assessment process according to strict standards of toxicology: Quantitation of azo/pigment forming specific amine compounds, formaldehyde, pH, and colorfastness to verify that no impurification has happened during the production process. Step 10 is a "Human Repeat Insult Patch Test" (HRIPT Test), a clinical study on human subjects to verify that textile is "Hypo-allergenic," "Dermatologist-tested", "Non-irritating" and "Suitable for sensitive skin," a final test to rule out that any skin irritating substances have tainted the fabric.

A laboratory test against strict toxicological standard verifies the correct dyeing and processing (Steps 5-8) methods have been applied. The final HRIPT Test is the last check that no chemicals or plant materials have entered the fabrics that could cause dermatological adverse effects. A failure of any of the gates should halt the production process. By following the above-listed steps, in the order listed, a fabric avoids or highly limits any form of irritations that can cause discomfort to sensitive skin.

Organic cotton and herbal dyes, such as natural indigo dye are preferred ingredients. The absence of any other added processing chemicals that could have unwanted side-effects is also preferred. The toxicological and the HRIPT tests are preferred to verify the dermatological quality of products and rule out impurities and scientifically back the claim "hypoallergenic." The GOTS certification is optional, but it allows to stop the process at an early stage through an independent third party. Plant-based and hypoallergenic finishing could be added if it improves the positive properties of the fabric.

Steps 5-7 can be reversed depending when dyeing is done on cotton bolls, yarn, or woven/knitted fabric. Other weave types could produce similarly gentle fabrics while giving fabric additional properties that sateen does not have (e.g., stretchability). Instead of indigo leaf dye, other plant dyes that also have positive dermatological effects could be used such as pomegranate, gardenia, madder, onion, mango, or different woods (e.g., Jackwood, sandalwood).

EXAMPLE

The Japanese Industrial Standard (JIS) issued a testing method to determine the antibacterial activity (expressed as an Index), of antimicrobial-treated (compounded) materials or articles. The antibacterial activity is calculated dividing the number of bacteria present after 24 hours of cultivation onto a testing treated article/product (C) into the number of bacteria present after 24 hours of cultivation onto the corresponding untreated (without antimicrobial agent) article/product (B). An antibacterial index of >2.0 (≥99% killing ratio) of a treated article with antimicrobial agent might be considered as "Antibacterial Article."

The test result shown below illustrates the medicinal/antibacterial properties of the inventive process.

| Sample | | Common logarithm for the number of bacteria (Max-Min) Immediately after inoculation | Common logarithm for the number of bacteria (Max-Min) After 18 h incubation | Antibacterial activity value |
|---|---|---|---|---|
| Conventional Fabric | Original | 4.54 (0.0) | 7.14 (0.0) | −0.1 |
| Aizome Bedding Fabric | Original | 4.38 (0.1) | 1.30 (0.0) | 5.7 |
| Control Fabric | | 4.55 (0.0) | 7.03 (0.1) | Growth value F: 2.5 |

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method for manufacturing medicinal fabric for dermatological use, consisting of the steps of:

selecting 100% organic *Gossypium barbadense* cotton fiber having a staple length of 1.125 to 1.25 inches;

processing the cotton fiber as greige cotton in the absence of bleach;

verifying the cotton fiber meets GOTS organic certification standards;

fermenting indigo leaves for 24-72 hours to produce a medicinally active dye solution;

dyeing the cotton fiber with the dye solution using dual-frequency ultrasonic energy at 20-28 KHz during dyeing at 15-35° C. for 10-60 minutes with intensity of 0.1-0.8 W/cm$^2$, followed by soaping at 28-55 KHz at 20-35° C. for 5-30 minutes with intensity of 0.2-1 W/cm$^2$;

weaving the dyed cotton fiber in a sateen weave pattern; and verifying the woven fabric achieves an antibacterial index greater than 5.0 per JIS L 1902:2015 testing standard.

\* \* \* \* \*